United States Patent [19]

Vasile

[11] Patent Number: 4,930,444
[45] Date of Patent: Jun. 5, 1990

[54] APPARATUS AND METHOD OF FISHING FOR SWIMMING FISH

[76] Inventor: Vincent R. Vasile, One Carriage Rd., Roslyn, N.Y. 11576

[21] Appl. No.: 249,403

[22] Filed: Sep. 26, 1988

[51] Int. Cl.⁵ ............................................. A01K 63/00
[52] U.S. Cl. ........................................ 119/3; 114/321
[58] Field of Search .................... 119/1, 3, 4; 114/321

[56] References Cited

U.S. PATENT DOCUMENTS

| | | | |
|---|---|---|---|
| 4,214,551 | 7/1980 | McNeil et al. | 119/3 |
| 4,257,350 | 3/1981 | Streichenberger | 119/3 |
| 4,762,084 | 8/1988 | Stissing | 119/3 |
| 4,798,169 | 1/1989 | Rosen et al. | 119/3 |

FOREIGN PATENT DOCUMENTS

| | | | |
|---|---|---|---|
| 8704319 | 7/1987 | PCT Int'l Appl. | 119/3 |
| 8704320 | 7/1987 | PCT Int'l Appl. | 119/3 |
| 498936 | 4/1976 | U.S.S.R. | 119/3 |
| 1227137 | 4/1986 | U.S.S.R. | 119/3 |
| 1590781 | 6/1981 | United Kingdom | 119/3 |

*Primary Examiner*—John Weiss
*Attorney, Agent, or Firm*—Felfe & Lynch

[57] ABSTRACT

A method of fishing for swimming fish while nourishing the fish with sea water containing plankton and apparatus therefor. Fish eggs are individually disposed in openings in trays which are fed with fresh sea water containing plankton until the eggs are at least partially hatched, whereupon freshly hatched swimming fish pass through the openings with the flow of sea water. The trays are connected with first compartments for freshly hatched swimming fish for feeding sea water and swimming fish thereto. The first compartments are connected to a compartment of a net having a mesh sufficiently fine to contain larger swimming fish and to prevent larger fish from entering the net compartment through the net. Sea water and larger swimming fish are fed from the first compartment to the net compartment having the sufficiently fine mesh. The net compartment is submerged under sea water and suspended on a floating movable object which can relocate the net compartment to an area of fresh sea water containing plankton when desired.

11 Claims, 6 Drawing Sheets

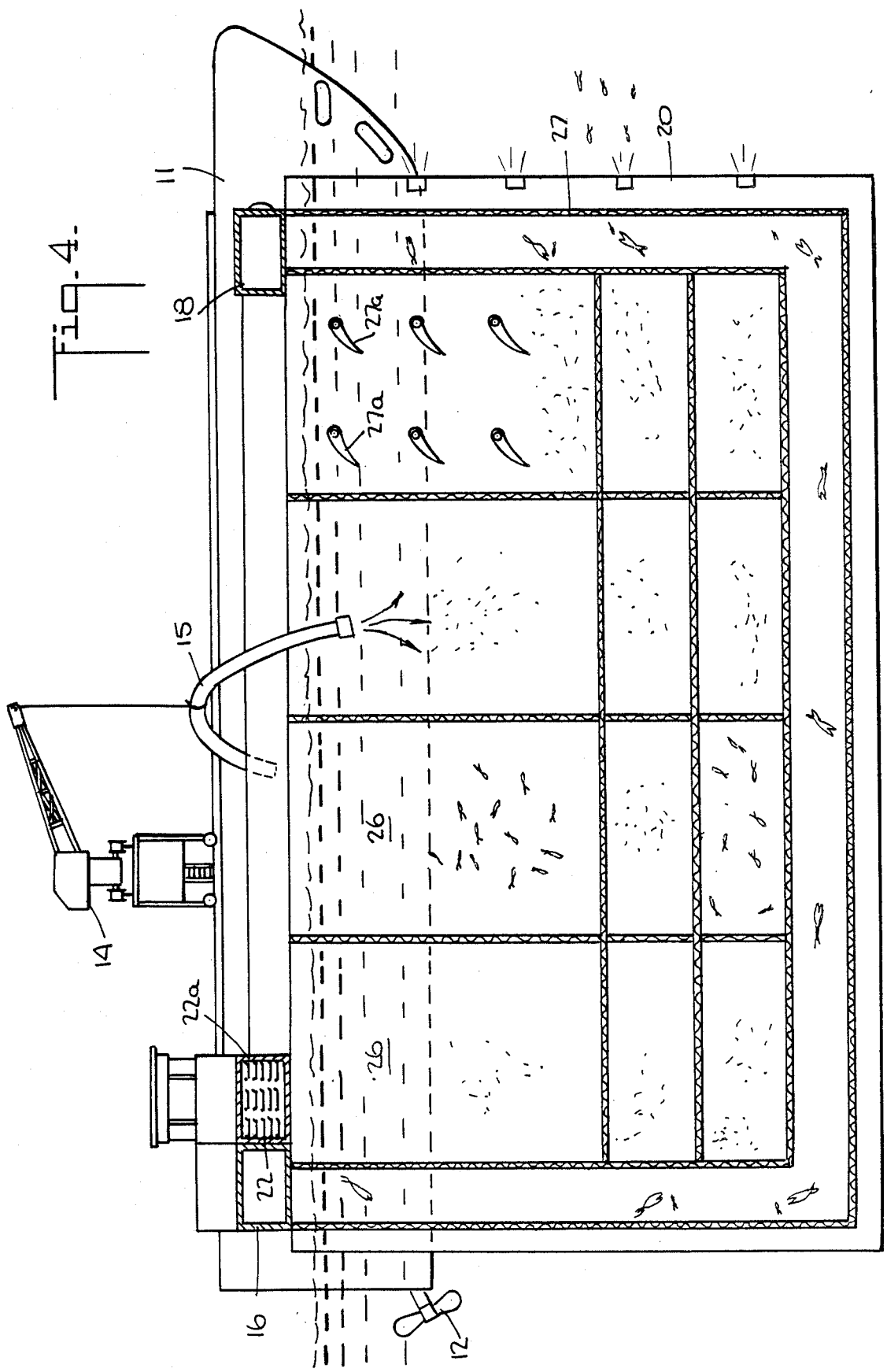

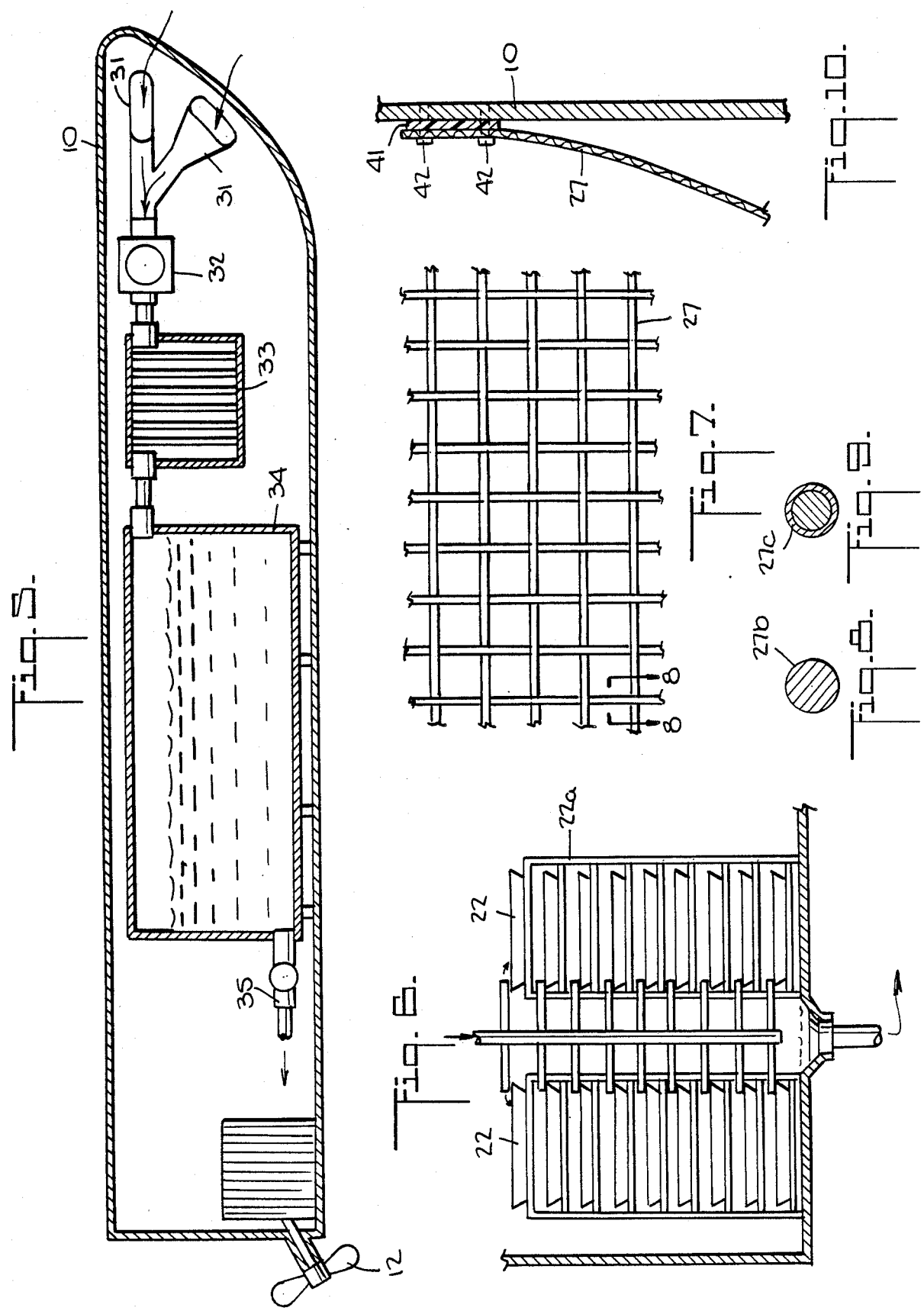

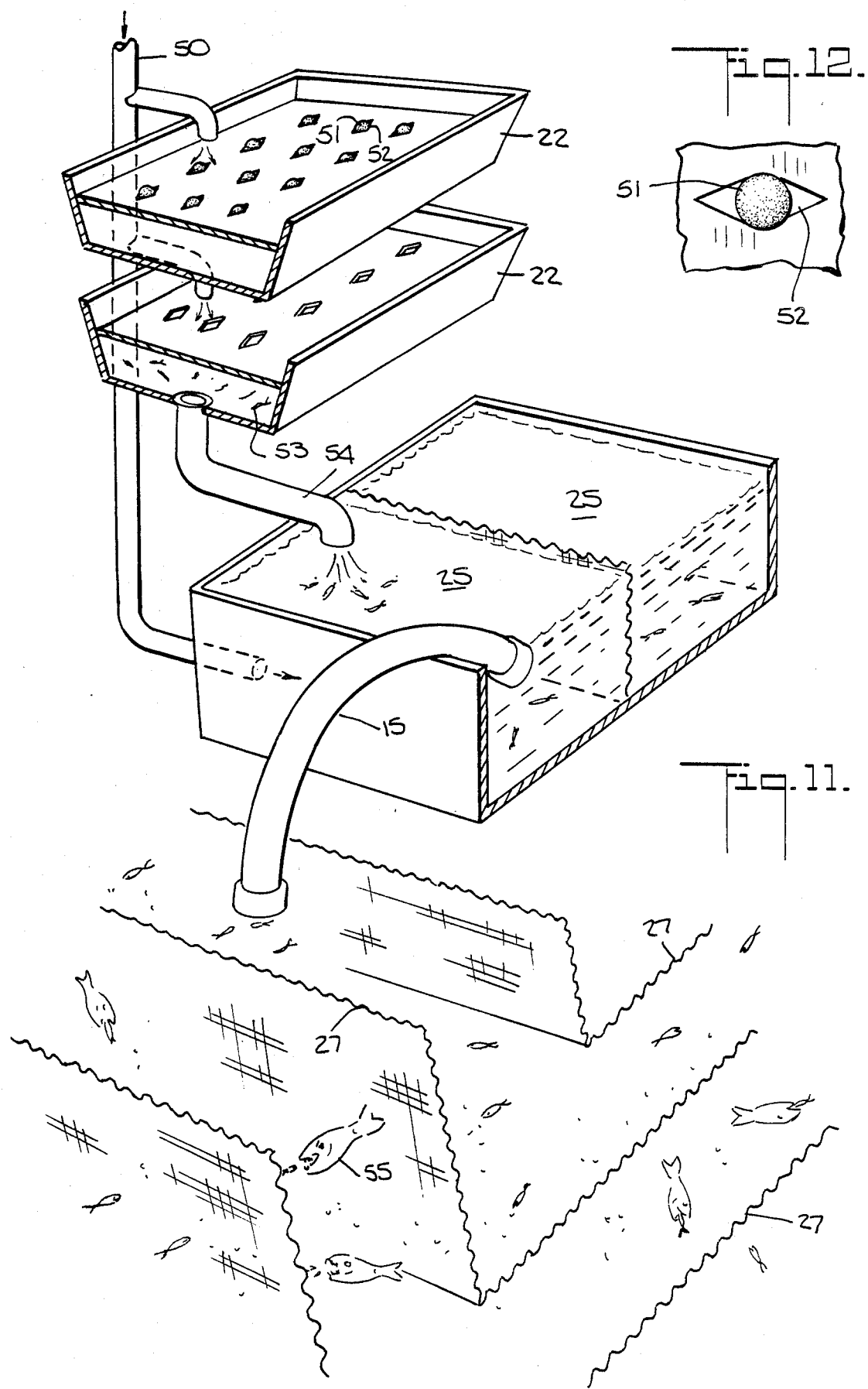

APPARATUS AND METHOD OF FISHING FOR SWIMMING FISH

This invention relates to a method of fishing for swimming fish while nourishing the fish with sea water containing plankton and apparatus therefor.

While developed technology has raised substantially the population of live fish from hatcheries released to waters in which they grow and survive to be later commercially netted and brought to market, fish abundance and low prices can only be obtained with the emergence of a new natural biological fish growing and management method. A present method of rearing fish involves a hatchery where parent or brood fish are selected for spawning. The sex products from the fish are then mixed and readied for an incubator. The fish hatch from eggs and each becomes a fry that is generally released to a rearing tank as soon as it starts feeding. After the fish reaches a predetermined size and weight, which may be as much as a year later, the fish is then freed in the water intended for the survivability of the small fish. Once freed in the unprotected water, many small fish succumb to predator fish and many never survive the trauma of transportation and ultimate release, and many more cannot switch from an aquatic environment that is controlled and altered chemically with the addition of antibiotics and various dissolved gasses to a natural aquatic environment.

It is an object of the present invention, therefore, to provide a new and improved method of fishing for swimming fish while nourishing the fish with sea water containing plankton and apparatus therefor.

It is another object of the invention to provide a new and improved apparatus and method of fishing for swimming fish while nourishing the fish with sea water containing plankton which confines the fish to a submerged movable container which fresh sea water can penetrate.

It is another object of the invention to provide a new and improved apparatus and method of fishing for swimming fish while nourishing the fish with sea water containing plankton in which the fish do not require transportation from an artificial environment using controlled and chemically altered sea water to an unprotected environment.

It is another object of the invention to provide a new and improved apparatus and method of fishing for swimming fish which provide an ecologically clean environment, wherein effluence (pollution) due to the fish itself is eliminated by ocean water flow in an expanded region as compared with bay or tank fishing.

In accordance with the invention, a method of fishing for swimming fish while nourishing the fish with sea water containing plankton comprises disposing swimming-fish egg in trays having openings for holding the eggs. The method also includes feeding fresh sea water containing plankton through the trays until the eggs are at least partially hatched whereupon freshly hatched swimming fish pass through the openings with the flow of sea water. The method also includes connecting the trays with first compartments for freshly hatched swimming fish for feeding sea water and swimming fish thereto. The method also includes connecting the first compartments for feeding sea water and large swimming fish to a compartment of a net having a mesh sufficiently fine to contain the larger swimming fish and to prevent larger fish from entering the net compartment. The method also includes submerging the net compartment under sea water and suspending the net compartment on a floating, movable object which can relocate the net compartment to an area of fresh sea water containing plankton when desired.

Also in accordance with the invention, apparatus for fishing for swimming fish while nourishing the fish with sea water containing plankton comprises tray means having openings for holding swimming-fish eggs. The apparatus also includes means for feeding fresh sea water containing plankton through the tray means until the eggs are at least partially hatched, whereupon freshly hatched swimming fish pass through the openings with the flow of sea water. The apparatus also includes first compartments for freshly hatched swimming fish and means for connecting the tray means with the first compartments for feeding sea water and swimming fish thereto. The apparatus also includes a compartment of a net having a mesh sufficiently fine to contain larger swimming fish and to prevent undesired larger fish from entering the net compartment. The apparatus also includes means for connecting the first compartments for feeding sea water and larger swimming fish to the net compartment. The apparatus also includes floating, movable means for suspending the net compartment under sea water and for relocating the net compartment to an area of fresh sea water containing plankton when desired.

For a better understanding of the present invention, together with other and further objects thereof, reference is made to the following description, and its scope will be pointed out in the appended claims.

Referring now to the drawings:

FIG. 4 is a sectional view of the FIG. 1 apparatus taken along line 4—4 of FIG. 3;

FIG. 5 is a sectional view of the FIG. 1 apparatus taken along line 5—5 of FIG. 3;

FIG. 6 is an elevational view of a portion of the FIG. 4 apparatus, to an enlarged scale;

FIG. 7 is an elevational view of a portion of a net of the FIG. 1 apparatus to an enlarged scale;

FIG. 8 is a sectional view of the FIG. 7 net taken along line 8—8 of FIG. 7 to an enlarged scale;

FIG. 9 is a sectional view, to an enlarged scale, of a portion of a net similar to the FIG. 8 view wherein the net is made of a plurality of materials;

FIG. 10 is a fragmentary view, partly diagrammatic, of a net attached to a floating supporting structure;

FIG. 11 is a schematic view to an enlarged scale representing apparatus in accordance with the invention and for carrying out the method of the invention; and FIG. 12 is a fragmentary view to an enlarged scale of a portion of the FIG. 11 apparatus holding a fish egg therein.

Figure 1:
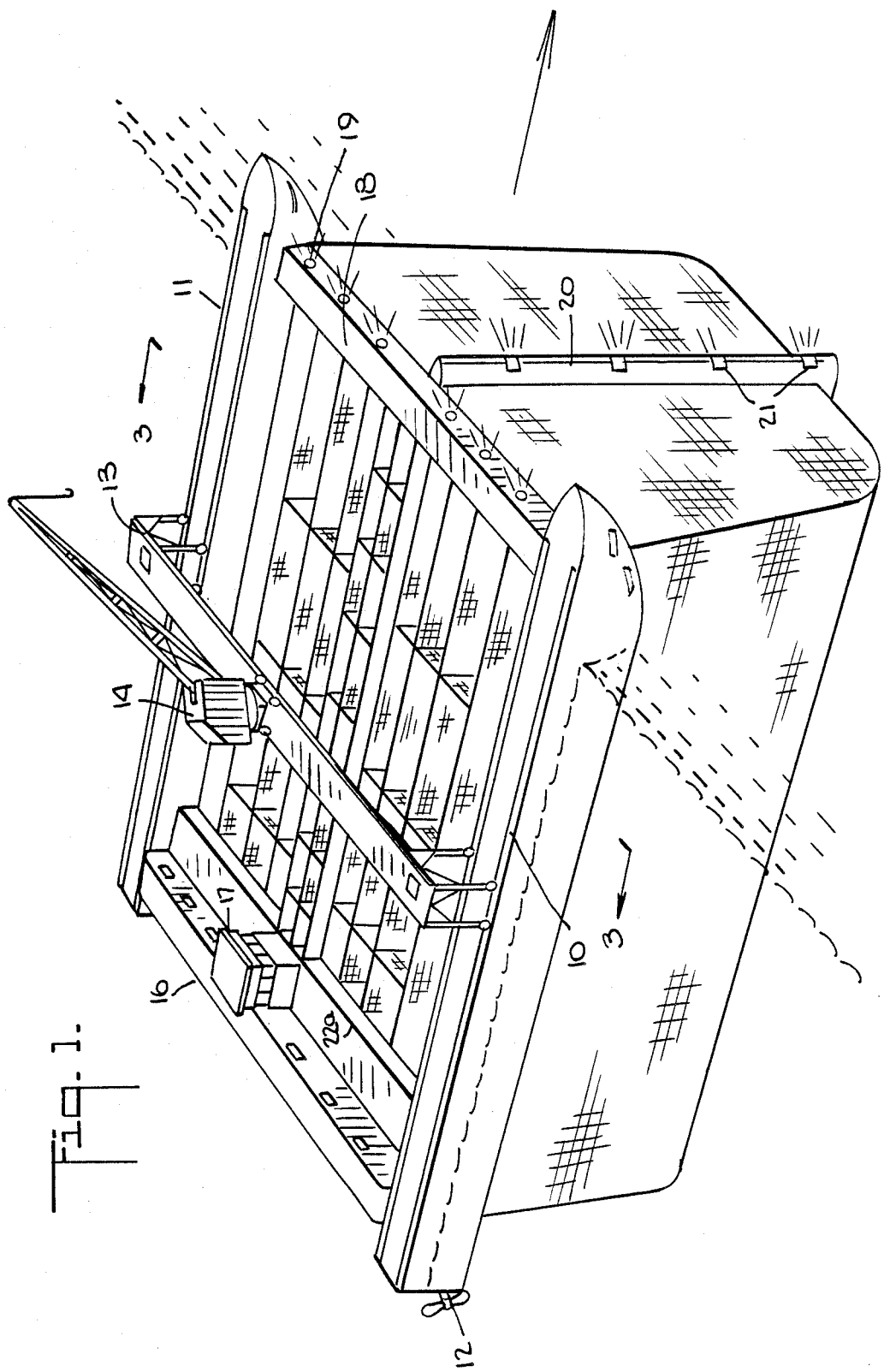
FIG. 1 is a perspective view of floating apparatus in accordance with the present invention and suitable for carrying out the method of the invention.

Referring now more particularly to FIG. 1 of the drawings, there is represented apparatus in accordance with the invention comprising, for example, at least one floater, hull and preferably two floating hulls 10, 11, preferably each having a propeller 12, and connected by a rigid structure 13 serving as a crane mount for a displaceable crane 14 for feeding a sea water conduit such as a hose 15 to selected locations over fish compartments supported by the hulls 10, 11. The apparatus may have crew's quarters 16 with a steering compartment or bridge 17 attached thereto. The apparatus preferably also has a rigid frame member 18 supporting lights 19 and a vertical rigid member 20 supporting lights 21. Fish egg trays, described more fully hereinafter are supported within a housing 22a.

Figure 2:
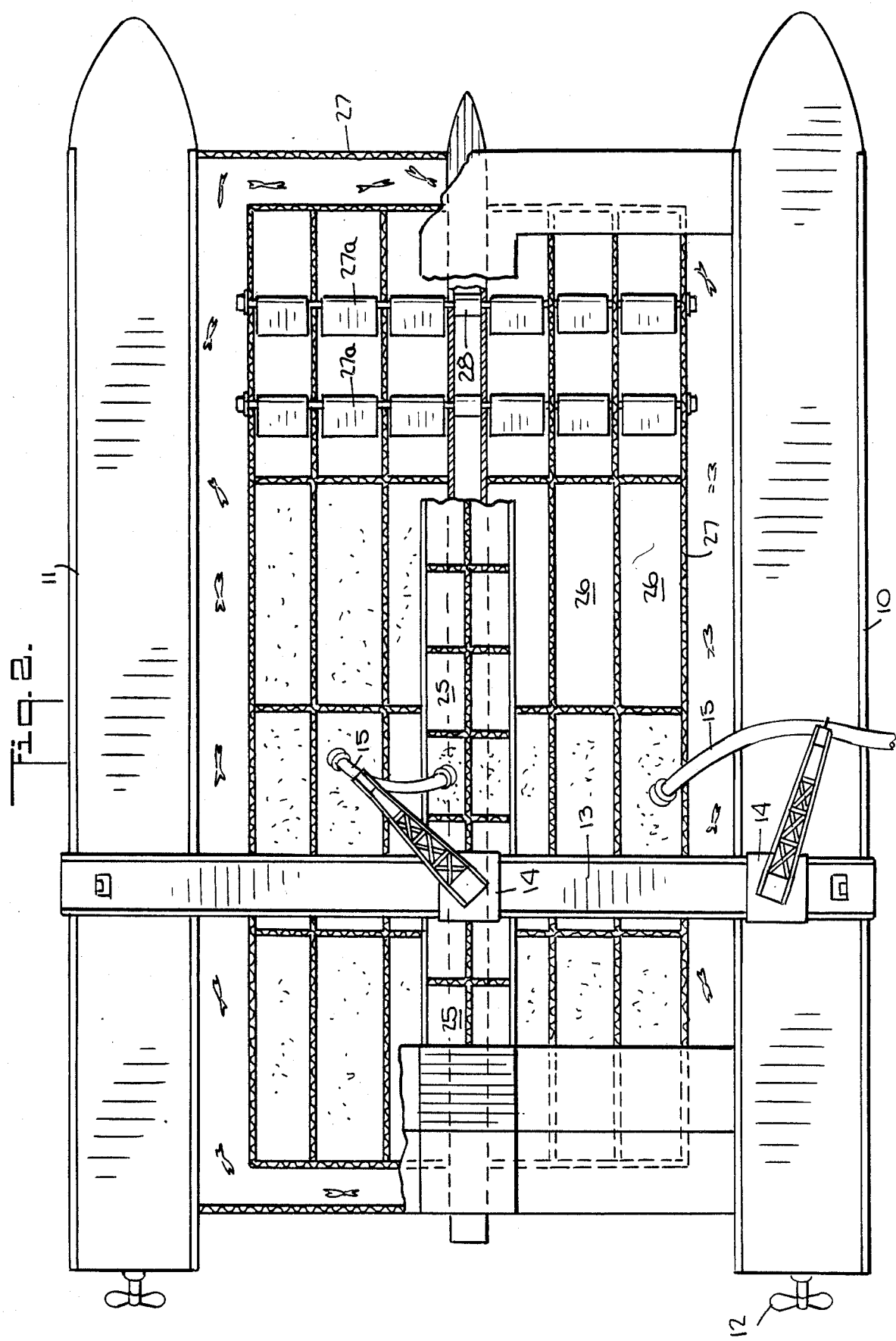
FIG. 2 is a plan view of the FIG. 1 apparatus, partly broken away.

As represented in FIG. 2, the crane 14 may be displaced along the member 13 to locate the hose 15 in any of selected positions. The member 13 is displaceable forward and rearwardly of the hulls 10, 11. The compartments 25 are isolated compartments preferably having solid walls for containing little fish known as fry which can be moved from one compartment to another only by means of pumping sea water through the hose 15 carrying the fish therewith. The compartments 26, 26 are formed by and surrounded by a net 27 which preferably has a sufficiently fine mesh to contain larger swimming fish known as fingerlings and to prevent larger fish such as predators from entering the net compartments 26. Suitable displaceable louvers 27a are utilized to direct the flow of sea water through the net 27. The louvers 27a may be rotated by rotatable mounts 28 driven by a suitable motor and belt means (not shown).

Referring now more particularly to FIG. 4, a portion of the egg trays in housing 22a are represented with the crane 14 positioning a hose 15. As represented in FIG. 4, the hose 15 is feeding sea water containing fry from a compartment having solid walls to a compartment having walls made of netting.

Figure 3:
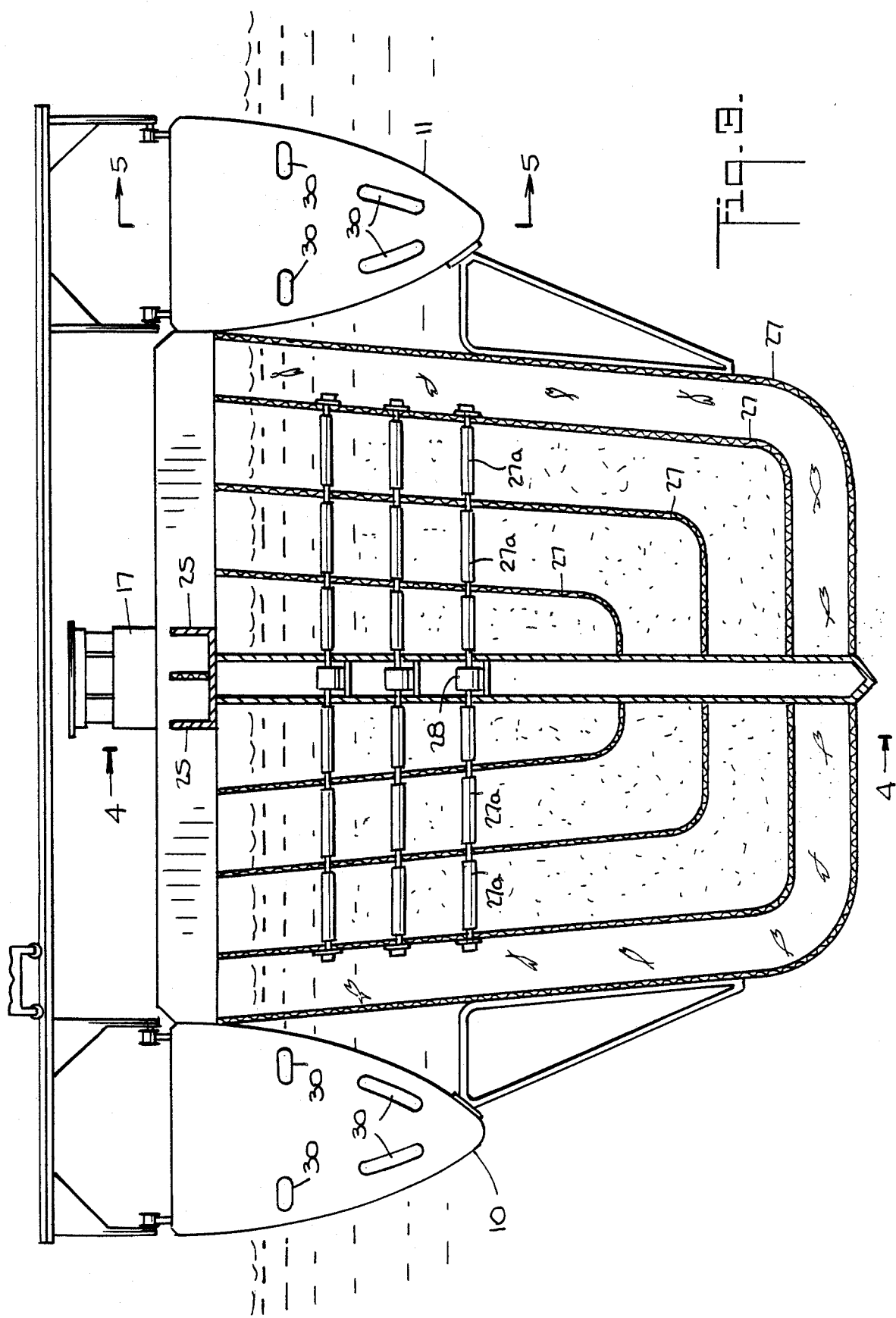
FIG. 3 is a sectional view of the FIG. 1 apparatus taken along line 3—3 of FIG. 1.

Referring now more particularly to FIG. 5 of the drawings, there is schematically represented a sea water feed system containing in, for example, the hull or pontoon 10. The sea water is pumped through openings 30 (FIG. 3) into piping 31 by a suitable pump 32 coupled to a filter 33 and a storage tank 34 from which the sea water is pumped to the egg trays through a piping system 35.

Referring now more particularly to FIG. 6, a rack housing 22a of swimming fish egg trays 22 is represented in elevational view. These trays may be seen more clearly with reference to FIG. 11 as explained hereinafter. The net 27 which totally encloses the floating fish hatchery except where supports of the hulls 10, 11 and framework 16, 18 and 20 form part of the enclosure may have a structure as represented more particularly in FIGS. 7 and 8 or FIGS. 7 and 9. The construction 27b of the strands of the net of FIG. 8 preferably is of solid copper which is attached to the hull 10 of galvanized steel as represented in FIG. 10 through a plastic insulating member 41 and plastic-coated galvanized steel bolts 42 to prevent an electrical reaction which would result in corrosion of the net or the hull.

FIG. 9 represents a sectional view of an alternative construction 27c of the strands of the net 27 comprising galvanized steel for a core surrounded by a copper cladding. The copper cladding protects the galvanized steel core from corrosion.

Aluminum or aluminum surrounded by a copper cladding may, for example, also be suitable for the strands of the net to prevent barnacle growth and algae growth. A 90%-10% copper-nickel alloy may also be suitable or a combination of several of the above-mentioned materials or materials yet to be discovered may be suitable for the strands of the net.

Referring now more particularly to FIG. 12, which is a schematic view to represent the apparatus and method of fishing for swimming fish while nourishing the fish with sea water containing plankton, fresh sea water is pumped through at least one conduit or pipe 50 to trays 22 containing fish eggs 51 in individual apertures 52. As the fish egg begins to hatch, it partly consumes itself, assuming a smaller size and passing from the upper tray 22 to the lower tray 22, where the hatched fish 53 known as fry pass with the sea water through the pipe 54 into a solid compartment 25. There are, of course, a plurality of such feeds to fill the compartments 25 with fresh sea water and fry. When the fry reach a size of approximately, for example, one inch, they are pumped through at least one hose 15 with fresh sea water into a region between nets 27 in which they are protected from predator fish 55 surrounding the net 27 and contained in the outermost net 27. The predator fish are useful for preventing any smaller fish from passing through the outer net 27 and through the inner (middle) net 27 which might consume the fingerlings.

An automatic feeder of small dead fish may be utilized if the net is used to grow piscivorous fish which do not grow only on plankton.

From the foregoing description, it will be apparent that a method of fishing for swimming fish while nourishing the fish with sea water containing plankton comprises disposing swimming-fish eggs in trays 22 having openings 52 for holding the eggs 51. The method comprises feeding fresh sea water containing plankton through the trays until the eggs 51 are at least partially hatched whereupon freshly hatched swimming fish known as fry pass through the openings with the flow of sea water. The method comprises connecting the trays 22 with first compartments 25 for freshly hatched swimming fish for feeding sea water and swimming fish thereto. The fish eggs are disposed individually in openings 51 in the trays for holding the eggs 52. The step of feeding fresh sea water through the trays 22 comprises feeding fresh sea water through the trays until the eggs 51 at least partially hatch as fry. The method also comprises connecting the first compartments for feeding sea water and larger swimming fish to a compartment of a net having a mesh sufficiently fine to contain the larger swimming fish known as fingerlings and to prevent larger fish such as predators from entering the net compartment containing the fingerlings. The method also comprises submerging the net compartment under sea water and suspending the net compartment on a floating, movable, self-propelled object 10, 11, which can relocate the net compartment to an area of fresh sea water containing plankton when desired.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A method of fishing for swimming fish while nourishing the fish with sea water containing plankton comprising:
   disposing swimming fish eggs in trays having openings for holding said eggs;
   feeding fresh sea water containing plankton through said trays until said eggs are at least partially hatched whereupon freshly hatched swimming fish pass through said openings with the flow of sea water;

connecting said trays with first compartments for freshly hatched swimming fish for feeding sea water and swimming fish thereto;

connecting said first compartments for feeding sea water and larger swimming fish to a compartment of a net having a mesh sufficiently fine to contain said larger swimming fish and to prevent larger fish from entering said net compartment;

submerging said net compartment under sea water and suspending said net compartment on a floating, movable object which can relocate the net compartment to an area of fresh sea water containing plankton when desired.

2. A method in accordance with claim 1 in which the step of disposing of fish eggs in trays comprises disposing said fish eggs individually in said openings for holding said eggs.

3. A method in accordance with claim 1 in which the step of feeding fresh sea water through said trays comprises feeding fresh sea water through said trays until said eggs at least partially hatch as fry.

4. A method in accordance with claim 1 in which the step of connecting said compartments to a compartment of a net comprises connecting said first compartments to a compartment of a net having a mesh sufficiently fine to contain fingerlings.

5. A method in accordance with claim 1 which contains predator fish in a net compartment outside said net compartment containing said larger swimming fish.

6. Apparatus for fishing for swimming fish while nourishing the fish with sea water containing plankton comprising:

tray means having openings for holding swimming-fish eggs;

means for feeding fresh sea water containing plankton through said tray means until said eggs are at least partially hatched, whereupon freshly hatched swimming fish pass through said openings with the flow of sea water;

first compartments for freshly hatched swimming fish;

means for connecting said tray means with said first compartments for feeding sea water and swimming fish thereto;

a compartment of a net having a mesh sufficiently fine to contain larger swimming fish and to prevent undesired larger fish from entering said net compartment;

means for connecting said first compartments for feeding sea water and larger swimming fish to said net compartment;

floating, movable means for suspending said net compartment under sea water and for relocating said net compartment to an area of fresh sea water containing plankton when desired.

7. Apparatus in accordance with claim 6 in which said tray means comprises trays for holding said fish eggs individually in said openings.

8. Apparatus in accordance with claim 6 in which said means for feeding fresh sea water through said tray means comprises at least one conduit.

9. Apparatus in accordance with claim 6 in which said means for connecting said first compartments to said net compartment having a mesh sufficiently fine to contain larger swimming fish comprises at least one conduit.

10. Apparatus in accordance with claim 6 which comprises a net compartment containing predator fish outside said net compartment containing larger swimming fish.

11. Apparatus in accordance with claim 6 in which said floating movable means is self-propelled.

* * * * *